July 29, 1969     J. E. MAMBOURG ET AL     3,458,302

SEAL FOR GLASS FURNACE JOINTS

Filed March 25, 1966     2 Sheets-Sheet 1

INVENTORS
James E. Mambourg and
BY William E. McCown

Nobbe & Swope
ATTORNEYS

July 29, 1969 J. E. MAMBOURG ET AL 3,458,302
SEAL FOR GLASS FURNACE JOINTS
Filed March 25, 1966 2 Sheets-Sheet 2

INVENTORS
James E. Mambourg and
BY William E. McCown

Nobbe & Swope
ATTORNEYS

United States Patent Office 3,458,302
Patented July 29, 1969

3,458,302
SEAL FOR GLASS FURNACE JOINTS
James E. Mambourg, Shreveport, La., and William E. McCown, Toledo, Ohio, assignors to Libbey-Owens-Ford Glass Company, Toledo, Ohio, a corporation of Ohio
Filed Mar. 25, 1966, Ser. No. 537,549
Int. Cl. C03b 15/02
U.S. Cl. 65—203                                                    8 Claims

ABSTRACT OF THE DISCLOSURE

A seal for preventing the ingress of hot combustion gases from the pot chamber of the Colburn type window glass furnace to the drawing chamber thereof. An elongated receptacle is provided along the top of the rear draw pot wall, and a body of flowable material such as loose granular silica sand is maintained in the receptacle.

Figure 1:
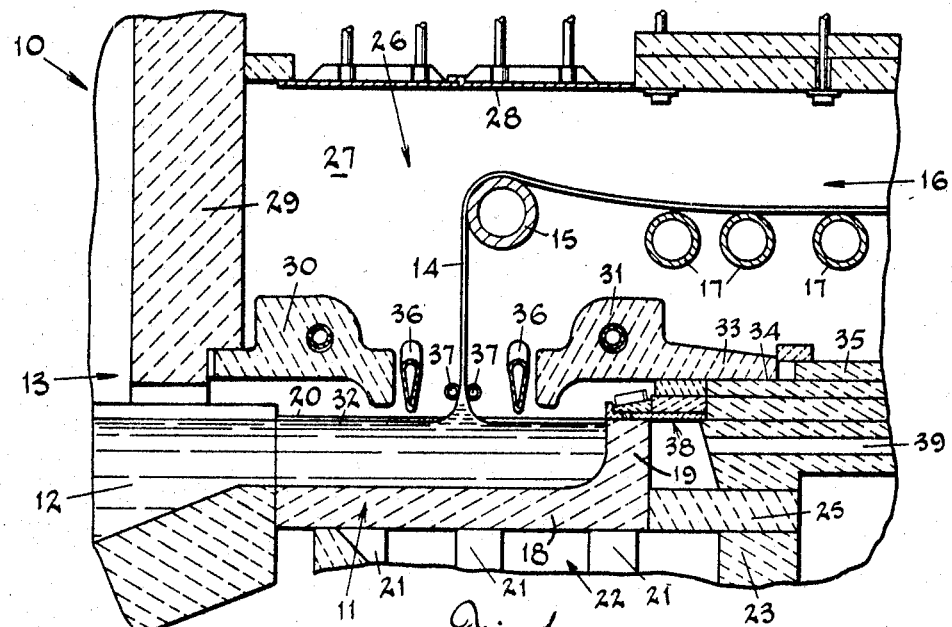

The present invention relates broadly to improvements in the drawing of sheet glass, and more particularly to an improved seal for preventing the entry of hot gases of combustion into the area of the furnace in which the sheet is formed from the bath of molten glass.

In the continuous production of sheet glass, raw glass-making ingredients are charged into the melting area of a tank furnace containing a mass of molten glass, wherein they are melted and integrated into the molten mass. The molten glass then flows successively through refining and cooling areas where it is properly conditioned for drawing into sheet form. Thereafter according to the so-called Colburn process, to which the present invention is particularly well adapted although it is in no way limited thereto, the molten glass flows into a relatively shallow working receptacle or draw pot where a sheet is continuously drawn upwardly from its surface. After traveling vertically for a short distance, the sheet or ribbon, while still in a pliable condition although substantially set in its final sheet form, is deflected about a bending roll and into a horizontal plane, and is then carried on a series of rolls into and through an annealing lehr.

In order to maintain the molten glass within the working receptacle or draw pot at the proper temperature for drawing, it is customary to heat the draw pot by directing the flames from combustion burners into a pot chamber beneath and around the draw pot. These hot gases generally flow upwardly along the rear wall of the draw pot in order to provide maximum heat to the molten glass adjacent thereto, and are then exhausted as, for example, through a flue in the floor of the adjacent annealing lehr. Additional heat may be provided to prevent divitrification of the molten glass along the rear wall of the draw pot by electric resistance heaters extending across the pot beneath the rear liptile.

The hot gases, if they enter the drawing chamber over the molten glass, have been found to introduce particles of dirt and create turbulence in the atmosphere over the molten glass and surrounding the newly formed sheet which may cause damage to the sheet. In order to avoid this undesirable condition, the space between the undersurface of the rear liptile and the rear wall of the draw pot may be closed off, as by refractory blocks or other means, so as to prevent entry of combustion gases from the pot chamber into the drawing chamber. Difficulty has been encountered heretofore in maintaining an air-tight seal however. The rear pot wall and the colsure means associated therewith tend to warp due to the high temperatures to which they are subjected, as will be hereinafter more fully explained, so that openings may occur at their junction. According to the invention, a positive seal is created between the adjacent members by maintaining a pocket of loose granular material at their interface.

An important object of the present invention, therefore, is to maintain a quiescent, dirt-free atmosphere in the drawing chamber of a sheet glass furnace.

Another object of the invention is to effectively seal the drawing chamber of such furnaces against the entry of gases of combustion from the pot chamber thereof while maintaining the proper temperature in the molten glass.

Still another object is to provide a seal along the rear wall of the draw pot of such furnaces which is effective independently of expansion, contraction and warping of the furnace components in that region.

Other objects and advantages of the invention will become more apparent during the course of the following description when taken in connection with the accompanying drawings.

Figure 2:
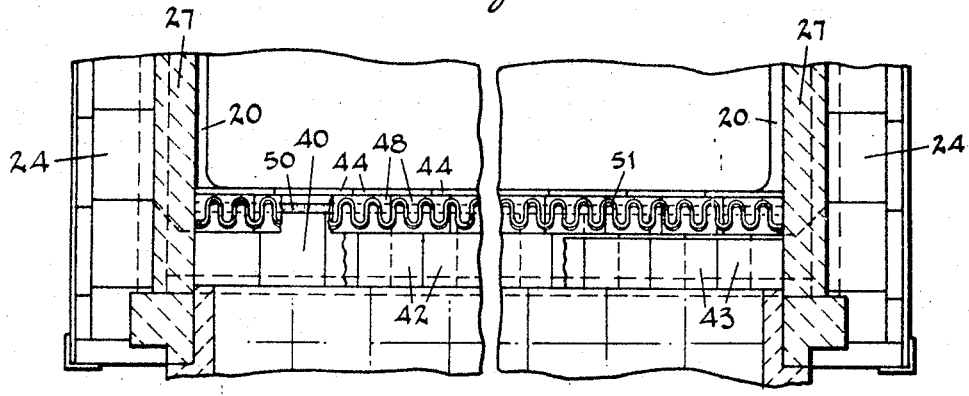
Figure 3:
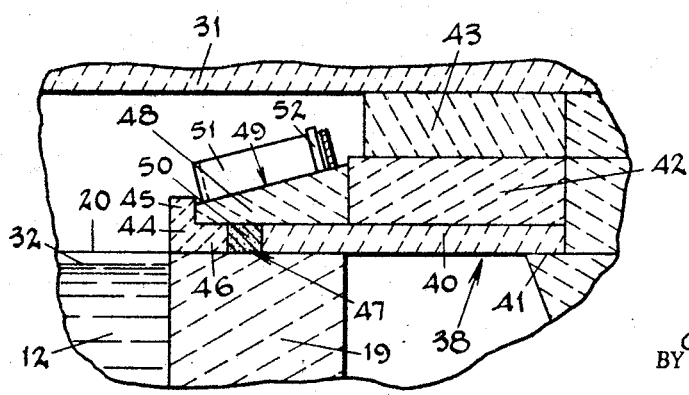
Figure 4:
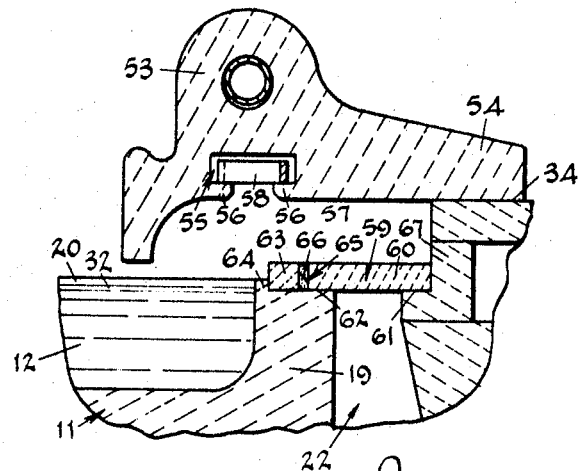
Figure 5:
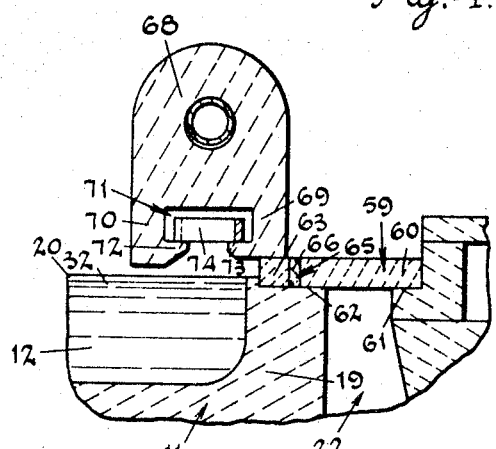
Figure 6:
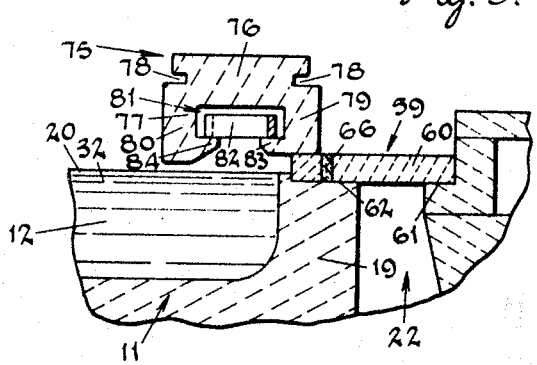

In the drawings wherein like numerals are employed to designate like parts throughout the same:
FIG. 1 is a partial longitudinal vertical sectional view of the working end of a sheet glass furnace and associated annealing lehr embodying the present invention;
FIG. 2 is a fragmentary plan view, with parts broken away, of the rear area of the draw pot;
FIG. 3 is an enlarged fragmentary vertical sectional view of the rear area of the draw pot of a sheet glass furnace embodying the invention;
FIG. 4 is an enlarged fragmentary vertical sectional view of an alternate embodiment of the invention employing a modified form of liptile and heating element;
FIG. 5 is an enlarged fragmentary vertical sectional view of another embodiment of the sealing member and associated liptiles; and
FIG. 6 is an enlarged fragmentary sectional view of still another embodiment of the sealing member and liptile.

Referring now to the drawings, there is shown in FIG. 1 thereof the working end of a continuous sheet glass furnace designated generally by the numeral 10, and including a draw pot or working receptacle 11 for continuously receiving a supply of molten glass 12. The molten glass is received in the draw pot after flowing successively through melting and refining chambers (not shown) and a cooling chamber, the latter portion of which is shown at 13 where it is properly conditioned in the conventional manner. A ribbon or sheet 14 is continuously drawn upwardly from the bath of molten glass in the draw pot and, according to the Colburn process, after it has traveled a short distance vertically is deflected about a bending roll 15 into a substantially horizontal plane. Thereafter, the ribbon is carried through an enclosed annealing lehr 16 on a series of horizontally aligned rolls 17 wherein it is subjected to controlled cooling prior to cutting into blanks of the desired size.

The draw pot or working receptacle 11, comprised of a floor 18, rear wall 19 and opposite side walls 20, is supported upon a plurality of pot stools 21. A pot chamber 22 is located beneath and around the draw pot, with the flames from burners (not shown) being introduced into the pot chamber through a rear wall 23 and side walls 24 thereof to assist in maintaining the molten glass within the draw pot at the proper working temperature as aforedescribed. A plurality of struts 25 rest on the rear wall 23 and engage the end of the draw pot to provide stability. A substantially enclosed drawing chamber 26, formed by opposite side walls 27 and a roof 28 and separated from the atmosphere over the molten glass in the cooling chamber by an end wall or arch 29, is located over the draw pot 11 to provide a quiescent atmosphere over the molten glass therein and surrounding the newly formed sheet. Maintenance of a quiescent atmosphere in this area is an important factor in maintaining temperature uniformity within the molten glass, particularly across the maniscus through which the sheet is drawn. It is well known, of course, that a lack of temperature uniformity causes undesirable thickness variations across the sheet.

A front liptile 30 positioned over the molten glass adjacent the arch 29, and a rear liptile 31 positioned above the rear wall 19 of the draw pot and extending over the molten glass at the rear of the draw pot, serve to minimize convection air currents over and reduce the loss of heat from the surface 32 of the molten glass so as to maintain a more uniform temperature therein. The rear liptile is provided with an extension 33 which projects over and rests upon a recess 34 at the end of the floor 35 of the annealing lehr. Sheet coolers 36 are conventionially located opposite either surface of the sheet for removing heat from the newly formed sheet so as to cause initial setting thereof, and pairs of knurled width maintaining rolls 37 engage the sheet at either edge above the meniscus in the usual manner to maintain the sheet at the desired width and overcome its natural tendency to narrow to a thread.

The molten glass at the rear of the draw pot, adjacent the wall 19, tends to stagnate and cool and will devitrify if not supplied with adequate heat. As previously indicated, for this purpose it is desirable that the hot gases in the pot chamber circulate upwardly along the rear of the draw pot so as to provide a source of heat in that area. According to the invention the gases are prevented from entering the drawing chamber by a barrier 38 beneath the rear liptile 31 which closes off the space between the rear wall 19 of the draw pot and the lehr floor 35. A flue 39 is provided in the lehr floor for exhausting the combustion gases from the pot chamber.

While the glass in the rear of the draw pot is heated by the gases in the pot chamber, the amount of heat transmitted thereto with the pot chamber sealed off completely from the working chamber as will be hereinafter described may be less than is normally required to maintain the desired temperature in the glass. Consequently, devitrification may occur along the rear pot wall. In order to supply additional localized heat, while at the same time avoiding creation of dirt and atmospheric turbulence in the drawing chamber, an electric resistance heater is employed in conjunction with the barrier.

The barrier 38, as best illustrated in FIG. 3, comprises a series of refractory base slabs 40 extending side-by-side across the furnace with one end resting on top of the rear wall 19 of the draw pot and the other end on a ledge 41 at the end of the lehr floor. A layer of blocks 42 rests upon the base slabs, the joints between adjacent blocks being offset from the joints between adjacent slabs 40 so that even if the joints should not be air tight, a direct path of access from the pot chamber to the drawing chamber will not be provided. An additional layer of blocks 43 fills in the space between the blocks 42 and the underside of the liptile 31. Again, the joints between the blocks are offset from the joints between the blocks 42 therebeneath.

An L-shaped sill 44 extends across the draw pot with its vertical leg 45 substantially flush with the interior face of the rear pot wall 19. The horizontal leg 46 of the sill is spaced somewhat from the adjacent edge of the base slab 40 so as to leave an elongated opening or receptacle 47 therebetween. A wedge-shaped block 48, having an inclined shelf 49 on its upper surface, rests upon the base slab 40 and horizontal leg 46 and extends over the elongated receptacle 47. The elongated receptacle is filled with a bulk or loose granular material 50, such as ordinary silica sand or a comparable material exhibiting similar flowable characteristics. The loose granular material rests upon the rear draw pot wall 19 and is confined between the base slab 40 and sill 44, so that it is independent of both members and will provide a seal between the pot chamber and drawing chamber even if the base slab or sill should warp or the joints between adjacent sections thereof should not be air tight. It is also contemplated that a material might be employed in the elongated receptacle which would melt and become a viscous liquid at the temperatures encountered.

It will be appreciated that the amount of heat entering the rear area of the draw pot is somewhat diminished due to the isolation of the hot combustion gases in the pot chamber. Additional heat is provided in this region by a resistance type heating element 51, resting upon the inclined shelf 49 of the block 48 and suitably connected to a source of electrical energy (not shown) in a conventional manner, the details of which do not constitute a part of the present invention. The heating element as illustrated in FIG. 2 is of serpentine configuration and is maintained in the proper location upon the shelf by a number of pegs 52 inserted into the block. The heating element may, of course, be formed of any one of a number of well-known materials, such as that known as "Hoskins Alloy 875" made by the Hoskins Manufacturing Company, of Detroit, Mich., and may assume any configuration. The serpentine form shown in the embodiment of FIGS. 1 to 3 has an advantage in that it can be formed with the convolutions thereof spaced closer or farther apart to increase or decrease the amount of heat furnished thereby. The heat radiated by the heating element is reflected by the undersurface of the liptile 31 down into the molten glass in the rear area of the draw pot. The amount of electrical energy required to maintain the molten glass at the desired temperature will, of course, depend upon a number of factors, but has been found generally to be in the neighborhood of 40 kw.

There is shown in FIG. 4 an alternate embodiment of the invention wherein the auxiliary heating element is incorporated into the rear liptile so that heat is radiated directly into the molten glass therebelow. More particularly, a liptile 53 is mounted over the molten glass at the rear of the draw pot with a rear projection 54 thereon resting on the recess 34 in the lehr floor in the manner of the liptile 31 described above. A slot 55 having a reduced opening formed by inwardly facing projections 56 is formed in the underside 57 of the liptile. An electrical resistance type heating element 58 is supported within the slot upon the projection 56, and is suitably connected to a supply of electrical power (not shown).

The pot chamber 22 is closed off from the drawing chamber at the rear of the draw pot by a barrier 59 including a baffle plate 60 resting at one edge on a ledge 61 at the end of the annealing lehr floor, and at the other edge on a recess 62 on the top of the rear wall 19 of the draw pot. A bar 63 also extends across the rear wall on the recess 62 adjacent a lip 64 formed at the inner edge of the wall by the recess. The bar is spaced from the edge of the baffle plate so as to form an elongated receptacle 65 therebetween, and the receptacle is filled with a loose granular material 66 to provide a seal as described in connection with the embodiment of FIGS. 1 to 3. While the rear edge of the baffle plate has been illustrated in FIG. 4 as resting on the ledge 61 and abutting against a vertical face 67 at the end of the lehr floor, it is within the contemplation of the invention that the baffle plate might stop short of the vertical face 67 so as to form an elongated receptacle between the vertical face and edge of the baffle plate, the receptacle being adapted to receive a quantity of loose granular material for forming a seal between the members as previously described.

The alternate embodiments of FIGS. 5 and 6 differ from the embodiment of FIG. 4 only in the construction of the liptile employed therein. Thus, the barrier 59 including the body of granular material 66 providing the seal is identical in the embodiments of FIGS. 4, 5 and 6.

The liptile 68 in the embodiment of FIG. 5 has one leg 69 which extends down onto the top of the bar 63 and another leg 70 projecting downwardly in proximity to the surface of the molten bath. A cavity 71 is formed between the legs 69 and 70 of the liptile. Projections 72 and 73 extend inwardly from the legs 69 and 70, respectively, to form a reduced throat section at the mouth of the cavity. A heating element 74, carried within the cavity 71 and supported upon the projections 72 and 73, is connected to a suitable source of electric power so as to radiate heat downwardly into the molten glass adjacent the rear wall of the draw pot.

As is well-known, liptiles are conventionally carried by a tubular beam inserted through an opening extending throughout the length of the liptile. The liptile 75 of the embodiment illustrated in FIG. 6 closely resembles the liptile 68, but is somewhat smaller and is supported in a different manner. Thus, it is formed with a reduced head portion 76 separated from the main body 77 by grooves 78 extending throughout the length of the liptile along either side thereof. Inwardly extending projections of a suitable carrier frame (not shown) positioned above the liptile are adapted to be received within the grooves to carry the liptile in the desired position. One leg 79 thereof extends downwardly onto the bar 63 and the other leg 80 extends downwardly into proximity with the molten bath so that a cavity 81 is formed between the legs as in the embodiment of FIG. 5. An electrical resistance heating element 82 rests upon projections 83 and 84 extending inwardly from the legs 79 and 80, respectively, and is connected to a suitable source of electrical energy so as to radiate heat into the molten glass therebelow. There is thus formed a substantially closed chamber over the molten bath beneath the liptile, so that the gases from the pot chamber are excluded and the heat from the heating element 82 is retained in the rear area of the draw pot to maintain the molten glass in that region at the desired temperature.

It is to be understood that the forms of the invention herewith shown and described are to be taken as illustrative embodiments only of the same, and that various changes in the shape, size, and arrangement of parts may be resorted to without departing from the spirit of the invention.

We claim:

1. In apparatus for the continuous production of window glass, including a draw pot in which a supply of molten glass is maintained, said draw pot including a rear wall and oppositely disposed side walls, a substantially enclosed drawing chamber above and in communication with said draw pot, a pot chamber beneath said draw pot and extending upwardly along the exterior of said rear wall means for introducing hot gases of combustion into said pot chamber for heating the molten glass in said draw pot, a liptile extending across said draw pot above said molten glass and rear wall, means extending across said draw pot beneath said liptile for radiantly heating the molten glass in the rear of said draw pot adjacent said rear wall, the improvement comprising sealing means on said rear wall preventing passage of said gases from said pot chamber over said rear wall into said drawing chamber, said sealing means including an upwardly projecting sill member extending across said draw pot along the top of said rear wall adjacent the interior surface thereof, a baffle member positioned over said upwardly extending portion of said pot chamber with one of its edges resting on the top of said rear wall, said one edge being spaced from said sill member so as to form between said sill and baffle members an elongated receptacle extending along the top of said rear wall, and a body of loose granular material within said receptacle.

2. In apparatus for the continuous production of window glass, including a draw pot in which a supply of molten glass is maintained, said draw pot including a rear wall and oppositely disposed side walls, a substantially enclosed drawing chamber above and in communication with said draw pot, a pot chamber beneath said draw pot and extending upwardly along the exterior of said rear wall, means for introducing hot gases of combustion into said pot chamber for heating the molten glass in said draw pot, means for drawing a continuous ribbon upwardly from said molten glass in said draw pot and deflecting the ribbon into a substantially horizontal path for passage through an adjacent annealing lehr, the improvement comprising sealing means on said rear wall preventing passage of said gases from said pot chamber over said rear wall into said drawing chamber, said sealing means including an upwardly projecting bar extending along the top of said rear wall adjacent the inner surface thereof, a baffle plate extending across said upward extension of said draw pot and closing off the space between said rear wall and the end of said annealing lehr, one edge of said baffle plate resting upon said rear wall, said one edge being spaced from said upwardly projecting bar so as to form between said bar and said baffle plate an elongated receptacle extending along the top of said rear wall, and a body of loose granular material within said receptacle.

3. Apparatus for the continuous production of window glass as claimed in claim 1, including a wedge block carried by said sill and baffle members and extending across said receptacle, said wedge block having a shelf on its upper face inclined downwardly in the direction of the molten glass in said draw pot, and a radiant heating member carried on said inclined shelf beneath said liptile for radiantly heating the molten glass in the rear of said draw pot adjacent said rear wall.

4. Apparatus for the continuous production of window glass as claimed in claim 3 wherein said sill member is L-shaped in cross section with its vertical leg adjacent the interior surface of said rear wall and its horizontal leg extending toward the exterior surface thereof, said wedge block being in abutting relation with the interior surface of the vertical leg, the lower edge of said inclined shelf being below the top of said vertical leg, said radiant heating member comprising an electric resistance element, and said granular material in said receptacle comprising loose granular silica sand.

5. Apparatus for the continuous production of window glass as claimed in claim 2, including a liptile extending transversely across said draw pot at the rear thereof above said molten glass and rear wall, and radiant heating means carried beneath said liptile for heating the molten glass at the rear of said draw pot.

6. Apparatus for the continuous production of window glass as claimed in claim 5, including a recess in the underside of said liptile, said heating element comprising an electric resistance element carried in said recess.

7. Apparatus for the continuous production of window glass as claimed in claim 5, the top of said rear wall being recessed to form a lip adjacent the inner surface thereof, said bar and said baffle plate resting on said recess with said bar abutting said lip.

8. Apparatus for the continuous production of window glass as claimed in claim 7, wherein said liptile includes a pair of spaced downwardly extending legs, an inwardly extending projection on each said leg, said radiant heating means comprising an electrical resistance heating element carried by said projections between said legs, one of said legs abutting against the upper surface of said bar.

References Cited

UNITED STATES PATENTS

| 1,421,211 | 6/1922 | Good | 65—347 X |
| 3,314,776 | 4/1967 | Mambourg et al. | 65—337 X |

S. LEON BASHORE, Primary Examiner

ARTHUR D. KELLOGG, Assistant Examiner

U.S. Cl. X.R.

65—338, 346, 347